(12) United States Patent
Kim et al.

(10) Patent No.: US 8,831,612 B2
(45) Date of Patent: Sep. 9, 2014

(54) HANDOVER METHOD AND APPARATUS

(75) Inventors: Hyun-Sook Kim, Gyeonggi-Do (KR);
Lae-Young Kim, Gyeonggi-Do (KR);
Tae-Hyeon Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 298 days.

(21) Appl. No.: 13/148,056

(22) PCT Filed: Feb. 4, 2010

(86) PCT No.: PCT/KR2010/000677
§ 371 (c)(1),
(2), (4) Date: Aug. 5, 2011

(87) PCT Pub. No.: WO2010/090451
PCT Pub. Date: Aug. 12, 2010

(65) Prior Publication Data
US 2011/0294509 A1 Dec. 1, 2011

Related U.S. Application Data

(60) Provisional application No. 61/150,785, filed on Feb. 8, 2009.

(30) Foreign Application Priority Data

Dec. 1, 2009 (KR) ........................ 10-2009-0118071

(51) Int. Cl.
*H04W 36/00* (2009.01)
*H04W 36/24* (2009.01)
*H04W 36/08* (2009.01)

(52) U.S. Cl.
CPC .............. *H04W 36/24* (2013.01); *H04W 36/08* (2013.01)
USPC ........ 455/436; 455/432.3; 455/425; 455/411; 455/443

(58) Field of Classification Search
USPC ...................... 455/436, 432.3, 425, 411, 443
See application file for complete search history.

(56) References Cited

U.S. PATENT DOCUMENTS

| 2007/0086387 A1 | 4/2007 | Kang et al. |
| 2007/0087751 A1 | 4/2007 | Voyer et al. |
| 2008/0008127 A1* | 1/2008 | Choi et al. ................... 370/331 |
| 2009/0274118 A1* | 11/2009 | De Sanctis et al. ........... 370/331 |

FOREIGN PATENT DOCUMENTS

| CN | 101242632 A | 8/2008 |
| CN | 101287294 A | 10/2008 |
| CN | 101291529 A | 10/2008 |
| EP | 1 991 026 A1 | 11/2008 |
| KR | 10-2007-0042101 A | 4/2007 |

* cited by examiner

*Primary Examiner* — Patrick Edouard
*Assistant Examiner* — Chuck Huynh
(74) *Attorney, Agent, or Firm* — Birch, Stewart, Kolasch & Birch, LLP

(57) ABSTRACT

A method of controlling handover in a server and including receiving a handover required message including information indicating that a Closed Subscriber Group (CSG) membership for a terminal in a Home (e)NodeB has expired; transmitting a handover command message to the Home (e)NodeB; receiving a status report message from the Home (e)NodeB indicating that the CSG membership for the terminal is updated; receiving information related to a CSG membership of the terminal from a Home Subscriber Server (HSS) if the terminal handover was performed from the Home (e)NodeB to another base station; determining that the terminal performs a reverse handover from the another base station to the Home (e)NodeB based on the status report message and information obtained from the HSS; and transmitting a control message to perform the reverse handover to another base station.

10 Claims, 7 Drawing Sheets

(a)

(b)

HANDOVER METHOD AND APPARATUS

CROSS REFERENCE TO RELATED APPLICATIONS

This application is the National Phase of PCT/KR2010/000677 filed on Feb. 4, 2010, which claims priority under 35 U.S.C. 119(e) to U.S. Provisional Application No. 61/150,785 filed on Feb. 8, 2009 and under 35 U.S.C. 119(a) to Patent Application No. 10-2009-0118071 filed in Republic of Korea, on Dec. 1, 2009. The entire contents of all of the above applications are hereby incorporated by reference into the present application.

TECHNICAL FIELD

The present invention relates to a mobile communication system.

BACKGROUND ART

In order to cope with various forums and new technologies related to the 4th generation mobile communications, the 3rd Generation Partnership Project (3GPP) who enacts the technical standards of 3G mobile communication systems has proceeded with studies on the Long Term Evolution/System Architecture Evolution (LTE/SAE) technologies since the end of 2004 as a part of the effort to optimize and enhance the performance of 3GPP technologies.

The SAE led by 3GPP SA WG2 is a study on network technologies for the purpose of determining a network structure together with the LTE work of 3GPP TSG RAN and supporting mobility between heterogeneous networks. In recent years, the SAE has been considered one of the latest important standard issues in 3GPP. It is a work to develop a system supporting various radio access technologies on the basis of 3GPP IP systems, and has been progressed to aim at an optimized packet based system that minimizes a transmission delay with enhanced transmission capability.

A high-level reference model defined by 3GPP SA WG2 includes a non-roaming case and roaming cases having various scenarios, and the detailed description thereof is given in 3GPP standard documents TS 23.401 and TS 23.402. In FIG. 1, there is illustrated a structural diagram of a network in which the model is schematically reconfigured.

FIG. 1 is a structural diagram illustrating an evolved mobile communication network.

One of the distinctive characteristics of the network structure of FIG. 1 is that it is based on a 2-tier model having an eNode B of the Evolved UTRAN and a gateway of the core network. The eNode B has a similar function, although not exactly the same, to the eNode B and RNC of the existing UMTS system, and the gateway has a function similar to the SGSN/GGSN of the existing system.

Another distinctive characteristic is that the control plane and the user plane between the access system and the core network are exchanged with different interfaces. While one Iu interface exists between the RNC and the SGSN in the existing UMTS system, two separate interfaces, i.e., S1-MME and S1-U, are used in the Evolved Packet Core (SAE) system since the Mobility Management Entity (MME) 51 taking charge of the processing of a control signal is structured to be separated from the gateway (GW). For the GW, there are two types of gateways, a serving gateway (hereinafter, 'S-GW') 52 and a packet data network gateway (hereinafter, 'PDN-GW' or 'P-GW') 53.

FIG. 2 is a view illustrating a relation between an (e)NodeB and a Home (e)NodeB.

In the 3rd or 4th generation mobile communication systems, attempts continue to increase their cell capacity in order to support high-capacity and bi-directional services such as multimedia contents, streaming, and the like.

In other words, with the development of communication and widespread multimedia technologies, various high-capacity transmission technologies are required, and accordingly, a method of allocating more frequency resources is used to increase radio capacity, but there is a limit to allocate more frequency resources to a plurality of users with restricted frequency resources.

In order to increase cell capacity, there has been an approach in which high frequency bandwidth is used and the cell diameter is reduced. If a cell having a small cell radius such as a pico cell is applied, it is possible to use a higher bandwidth than the frequency that has been used in the existing cellular system, thereby providing an advantage capable of transmitting more information. However, more base stations should be installed in the same area, thereby having a disadvantage of high investment cost.

In recent years, a femto base station such as Home (e)NodeB 30 has been proposed among the approaches for increasing cell capacity using such a small cell.

Studies on the Home (e)NodeB 30 have been started by 3GPP Home (e)NodeB WG3, and also in recent years, actively proceeded by SA WG.

An (e)NodeB 20 illustrated in FIG. 2 corresponds to a macro base station, and a Home (e)NodeB 30 illustrated FIG. 2 may be a femto base station. This specification will be described based on the terms of 3GPP, and the term (e)NodeB is used when referring to both NodeB and eNodeB. Also, the term Home (e)NodeB is used when referring to both Home NodeB and Home eNodeB.

The (e)NodeB 20 transmits and receives a signal of the MME 51 and control plane, and transmits or receives a signal of the S-GW 52 and user plane. Similarly, the Home (e)NodeB 30 also transmits or receives a signal of the MME 51 and control plane, and transmits and receives data of the S-GW 52 and user plane. The PDN-GW 53 performs a role of transmitting and/or receiving data from the S-GW 52 to and/or from an IP service network of the mobile communication service provider.

The interface illustrated in a dotted line denotes a control signal transmission between an (e)NodeB 20 and a Home (e)NodeB 30 and MME 510. Also, the interface illustrated in a solid line denotes a data transmission of the user plane.

FIG. 3 is an exemplary view illustrating a network structure including a Home Node and a Home (e)NodeB.

As illustrated in FIG. 3(a), a core network 50 may include a MME 51, a serving gateway (S-GW) 52, a SGSN 56, and a packet data network gateway or PDN gateway (P-GW) 53. In addition, the core network 50 may further include a PCRF 54, and HSS 55.

In FIG. 3(a), there are illustrated a Home NodeB 31 by the UMTS terrestrial radio access network (UTRAN) and a Home eNodeB 32 by the evolved-UTRAN (E-UTRAN) 32. The Home NodeB 31 by the UTRAN is connected to the SGSN 56 through a gateway 35. The Home eNodeB 32 by the E-UTRAN is connected to the MME 51 and the S-GW 52. Here, a control signal is transmitted to the MME 51, and a user data signal is transmitted to the S-GW 52. Furthermore, there may exist a gateway 35 between the Home eNodeB 32 by the E-UTRAN and the MME 51.

On the other hand, referring to FIG. 3(b), there is illustrated an interface of the Home eNodeB 32 by the E-UTRAN. The Home eNodeB 32 by the E-UTRAN and the gateway 35 are referred to as a Home eNodeB subsystem. The Home eNodeB 32 by the E-UTRAN is connected to the UE 10 through an LTE-Uu interface. The Home eNodeB 32 by the E-UTRAN is connected to the MME 51 through a S1-MME interface. Also, the Home eNodeB 32 by the E-UTRAN is connected to the S-GW 52 through a S1-U interface. Here, the S1-MME interface and the S1-U interface may pass through the gateway 35. The MME 51 and the S-GW 52 are connected to each other through a S11 interface. Furthermore, the MME 51 and the HSS 55 are connected to each other through a S6a interface.

FIG. 4 is an exemplary view illustrating an interface between a Home (e)NodeB 32 and a MME 51 illustrated in FIG. 3 using a protocol stack.

As illustrated in FIG. 4, the Home eNodeB 32 and the MME 51 may include a first layer (physical layer), a second layer (medium access control layer), a third layer (Internet protocol (IP) layer), a signaling control transmission protocol (SCTP), and a S1 application protocol (S1-AP), respectively.

The S1-AP is an application layer protocol between the Home eNodeB 32 and the MME 51. The SCTP guarantees the transmission of a signaling message between the Home eNodeB 32 and the MME 51.

DISCLOSURE OF INVENTION

Solution to Problem

In the foregoing related art, the UE 10 can select an appropriate cell between a cell of the (e)NodeB 20 and a cell of the Home (e)NodeB 30 to perform a cell selection operation. Furthermore, the UE 10 may access or attach to the selected cell.

However, there is a problem that the UE 10 cannot perform a handover to the (e)NodeB 20 while receiving a service through the Home (e)NodeB 30 subsequent to accessing or attaching to either one of the cells, for instance, Home (e)NodeB 30.

Particularly, since the handover cannot be performed, there is a problem that the on-going service of the UE 10 is dropped when encountering a situation that the Home (e)NodeB 30 cannot provide a service to the UE 10 any more.

In order to solve the foregoing problem, there have been attempts to hand over the UE 10 receiving a service through the Home (e)NodeB 30 to the (e)NodeB 20.

However, those attempts have merely handed over to the (e)NodeB 20 if it is more appropriate to receive a service from the (e)NodeB 20 as the UE 10 receiving a service through the Home (e)NodeB 30 is geographically moved.

Nevertheless, there may be a situation that the Home (e)NodeB 30 cannot temporarily provide a service according to various reasons, but those various reasons have not been considered in the related art. As a result, there is a problem that the on-going service of the UE 10 is dropped due to the situation of the Home (e)NodeB 30.

Accordingly, an object of the present invention is to solve the foregoing problem. In other words, it is an object of the present invention to hand over the UE 10 receiving a service through a particular Home (e)NodeB to another appropriate Home (e)NodeB or (e)NodeB according to the condition of the Home (e)NodeB.

Furthermore, another object of the present invention is to perform a reverse handover for the UE, which performs a handover to the another appropriate Home (e)NodeB or (e)NodeB, to the particular Home (e)NodeB when the particular Home (e)NodeB is changed to a condition capable of providing a service.

In order to accomplish the foregoing object, according to the present invention, in case where it is inappropriate for a particular Home (e)NodeB providing a service to a particular UE to continue to provide the service on the ground of a changed status, such as overload, temporary drop due to maintenance, expiry of CSG membership for the UE, increase of temporary interference, policy change, or the like, the Home (e)NodeB is allowed to transmit information on a cause that the UE performs a handover to another base station to an control entity within a network.

Furthermore, according to the present invention, it is allowed for the entity within the network to store information on the cause. In addition, according to the present invention, if the status of the particular Home (e)NodeB is changed, then the entity within the network is allowed to perform a reverse handover for the UE to the particular Home (e)NodeB on the basis of the information on the changed status and the information on the cause of the handover.

Specifically, in order to accomplish the foregoing object, according to the present invention, there is provided a method of controlling handover in a server in charge of a control plane within a mobile communication network. The handover control method may include receiving a handover request message including information on a cause that the terminal performs a handover from a Home (e)NodeB corresponding to a serving base station of the terminal to another base station; transmitting a handover command message to the Home (e)NodeB for the terminal to perform a handover to another base station; receiving a status report message from the Home (e)NodeB; determining whether or not the terminal performs a reverse handover from the another base station to the Home (e)NodeB based on whether the cause has been solved if the status report message is received; and transmitting a control message to perform the reverse handover based on the determination.

In order to accomplish the foregoing object, according to the present invention, there is provided a server in charge of a control plane within a mobile communication network. The server may include a transceiver transmitting a handover command message to a Home (e)NodeB for a terminal to perform a handover to another base station when receiving a handover request message including information on a cause that the terminal performs a handover from the Home (e)NodeB corresponding to a serving base station of the terminal to the another base station; and a controller determining whether or not the terminal performs a reverse handover from the another base station to the Home (e)NodeB based on whether the cause has been solved if a status report message from the Home (e)NodeB through the transceiver is received.

The handover request message may further include at least one of identification information of the terminal and information on the another base station.

The cause may include at least one of overload, maintenance, change of the CSG membership for the Home (e)NodeB, and policy change.

The status report message may be received from the Home (e)NodeB when the cause of the handover has been changed. The status report message may include information on whether the cause is solved.

The status report message may include at least one of a parameter indicating that the cause has been solved, information on the changed status, and information on the solved cause.

In the determining step, at least one of subscriber information of the terminal, policy information, membership information of the terminal for the Home (e)NodeB may be considered.

The control message may be transmitted to the another base station, and correspond to a message indicating reverse handover, a reverse handover request message or a handover request message.

The control message may be transmitted to the Home (e)NodeB, and correspond to a handover request message.

The information stored within the handover request message may be stored.

On the other hand, in order to accomplish the foregoing object, there is provided a method of handing over a terminal in a Home (e)NodeB system corresponding to a serving base station of the terminal. The handover method may include transmitting a handover request message including information on a cause that the terminal performs a handover to another base station to an entity within a network; receiving a handover command message from the entity within the network; delivering the handover command message to the terminal; and transmitting a status report message to the entity within the network when a situation corresponding to cause is changed.

The present invention is provided to solve the foregoing problem. In other words, according to the present invention, user equipment (UE) receiving a service from a particular Home (e)NodeB performs a handover to another appropriate Home (e)NodeB or (e)NodeB based on the status of the Home (e)NodeB. Furthermore, according to the present invention, when the status of the particular Home (e)NodeB is changed to a state capable of providing a service, the UE that has been performs handover to the another appropriate Home (e)NodeB or (e)NodeB performs a reverse handover to the particular Home (e)NodeB.

As a result, the present invention allows the UE to receive a service through a Home (e)NodeB capable of providing faster service. In addition, the present invention reduces the load of another base station, for instance, (e)NodeB.

Moreover, the present invention allows the UE to be connected to a particular H(e)NB even though radio signal in a cell of the neighboring base station is stronger, thereby allowing the UE to receive a more effective service.

MODE FOR THE INVENTION

Figure 1:
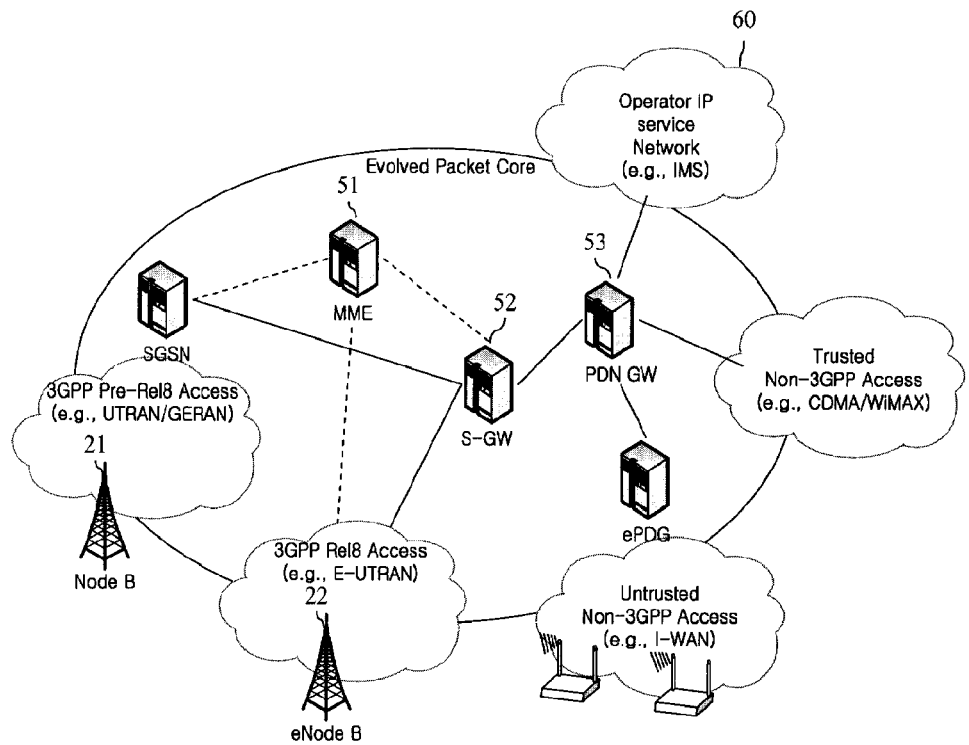
FIG. 1 is a structural diagram illustrating an evolved mobile communication network.
Figure 2:
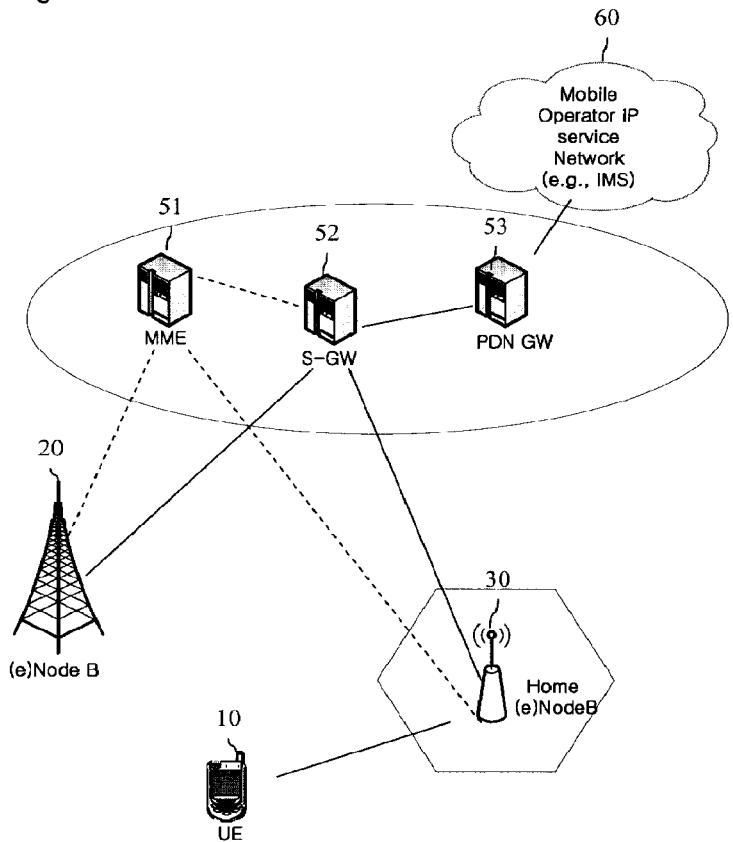
FIG. 2 is a view illustrating a relation between an (e)NodeB and a Home (e)NodeB.
Figure 3:
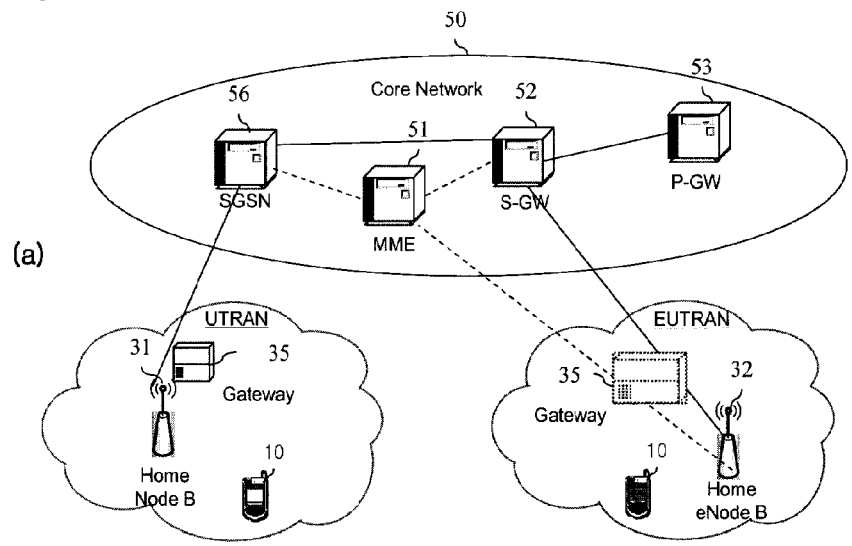
FIG. 3 is an exemplary view illustrating a network structure including a Home Node and a Home (e)NodeB.
Figure 3:
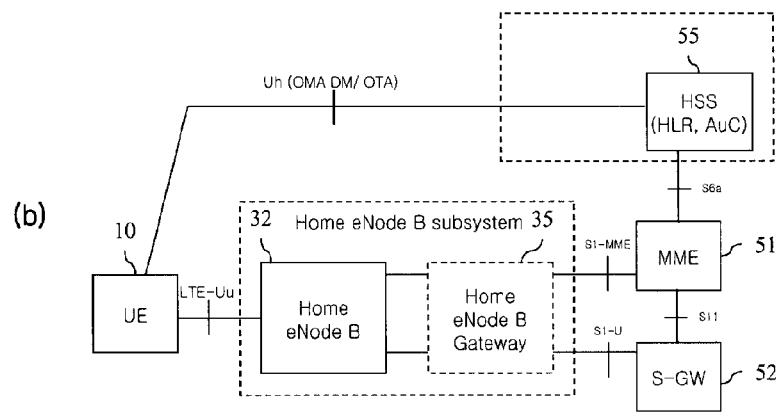
Figure 4:
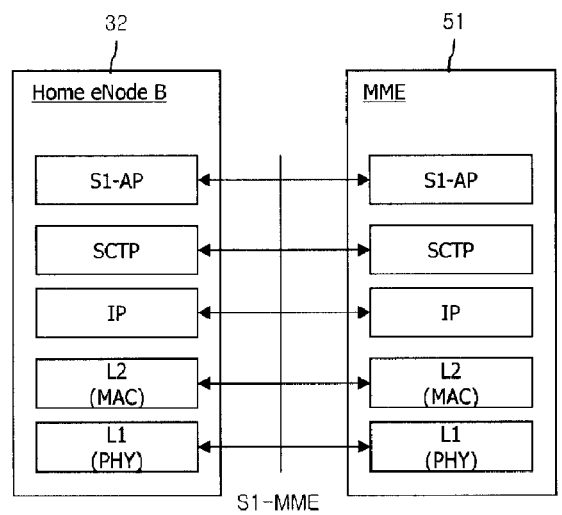
FIG. 4 is an exemplary view illustrating an interface between a Home (e)NodeB 32 and a MME 51 illustrated in FIG. 3 using a protocol stack.

The present invention will be described on the basis of a universal mobile telecommunication system (UMTS) and an evolved packet core (EPC). However, the present invention is not limited to such communication systems, and it may be also applicable to all kinds of communication systems and methods to which the technical spirit of the present invention is applied.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

Hereinafter, the term "terminal" is used, but the terminal may be also called UE (User Equipment), ME (Mobile Equipment), and MS (Mobile Station). Furthermore, the terminal may be portable equipment such as a portable phone, a PDA, a smart phone, and a notebook, or non-portable equipment such as a PC, and a vehicle-loaded device.

Furthermore, the term "Home (e)NodeB" is used below, but the Home (e)NodeB may be called a femto base station, a Home NodeB, and a Home eNodeB.

Definition of Terms

Hereinafter, the terms used in this specification will be briefly defined prior to describing with reference to the drawings.

UMTS: It is an abbreviation of Universal Mobile Telecommunication System and denotes the 3rd mobile communication network.

EPS: It is an abbreviation of Evolved Packet System, and denotes a core network supporting a Long Term Evolution (LTE) network. It is a network in the form of an evolved UMTS.

NodeB: It is installed outdoors as a base station of the UMTS network, and the size of the cell coverage corresponds to a macro cell.

eNodeB: It is installed outdoors as a base station of the Evolved Packet Core (EPC) network, and the size of the cell coverage corresponds to a macro cell.

(e)NodeB: It is a term indicating both NodeB and eNodeB.

Home NodeB: It is installed indoors as a base station of the UMTS network, and the size of the cell coverage corresponds to a femto cell.

Home eNodeB: It is installed indoors as a base station of the EPS network, and the size of the cell coverage corresponds to a femto cell.

Home (e)NodeB: It is a term indicating both Home NodeB and Home eNodeB.

Home (e)NodeB Gateway: It is connected to at least one Home (e)NodeB as a gateway performing a role of interfacing with a core network.

Home (e)NodeB Subsystem: It is a form of combining a Home (e)NodeB with a Home (e)NodeB Gateway into a set to manage a radio network. Both the Home (e)NodeB subsystem and the Home (e)NodeB perform a role of managing a radio network to link with a core network, and thus considered as an aggregate form. Accordingly, the terms "Home (e)NodeB" and "Home (e)NodeB subsystem" are interchangeably used below.

Closed Subscriber Group (CSG): It denotes a group having at least one Home (e)NodeB. The Home (e)NodeBs belonging to the CSG have a same CSG ID. Each user receives a license for each CSG.

Closed Access Mode: It denotes a mode in which a Home (e)NodeB is operated as a CSG cell. It operates in a method of allowing an access only to a user terminal that is allowed for the relevant cell. In other words, a terminal having an authority for the particular CSG IDs supported by a Home (e)NodeB is only accessible.

Open Access Mode: It denotes a mode in which a Home (e)NodeB is operated in a method similar to a normal cell (non-CSG cell) without the concept of CSG. In other words, it is operated like a normal (e)NodeB.

Hybrid Access Mode: It denotes a mode in which a Home (e)NodeB is operated as a CSG cell, but its access is also allowed to an non-CSG subscriber. The access is allowed for a user terminal having a particular CSG ID that can be supported by the relevant cell to provide a Home (e)NodeB service, and operated in a method in which even a terminal having no CSG authority is allowed to access.

CSG Cell: As a cell in part of a PLMN, it is accessible only by a member of the CSG group. For the purpose of this, the CSG cell broadcasts a CSG ID. The CSG cells sharing the same ID may be identified or managed as a group for the mobile management and charging.

CSG ID: As an identifier broadcasted by the CSG cell, it is used to facilitate the access of an authorized member of the CSG. The CSG ID is unique only within a PLMN.

Tracking Area: It is a basic unit for tracking the location of the UE 100 being operated in an idle mode. In other words, it is a basic unit for the location registration of the UE. The ID of the particular area is referred to as a tracking area identity (TAI). In the EPS, a terminal can be simultaneously location-registered to several TAs, and a TAI list is managed at this time.

TAI LIST: It is a set of location information, i.e., (e)NodeB or Home (e)NodeB in which the location registration is performed on a HSS or HLR through a MME based on the location movement of the UE.

Policy and Charging Control (PC): It denotes a management for the service provider's policy and charging.

Policy and Charging Rule Function (PCRF): It is a functional network element having the service provider's policy and charging rules to perform the PCC, and performs a role of providing the service provider's policy and charging rules to other nodes.

Description for the Concept of Schemes Proposed by this Specification

According to this specification, a scheme is proposed that in case where it is inappropriate for a particular Home (e)NodeB providing a service to a particular UE to continue to provide the service on the ground of a changed status, such as overload, temporary drop due to maintenance, expiry of CSG membership for the UE, increase of temporary interference, policy change, or the like, the UE performs a handover to another appropriate Home (e)NodeB or (e)NodeB by a control entity within a network, for instance, MME.

Furthermore, according to this specification, a scheme is proposed that the entity within the network stores information on a cause that the UE performs handover from the particular Home (e)NodeB to the another appropriate Home (e)NodeB or (e)NodeB. On the other hand, if the status of the particular Home (e)NodeB is changed, then the entity within the network performs a reverse handover for the UE to the particular Home (e)NodeB on the basis of the information on the changed status and the information on the cause of the handover.

Hereinafter, it will be described in detail with reference to the drawings.

Figure 5:
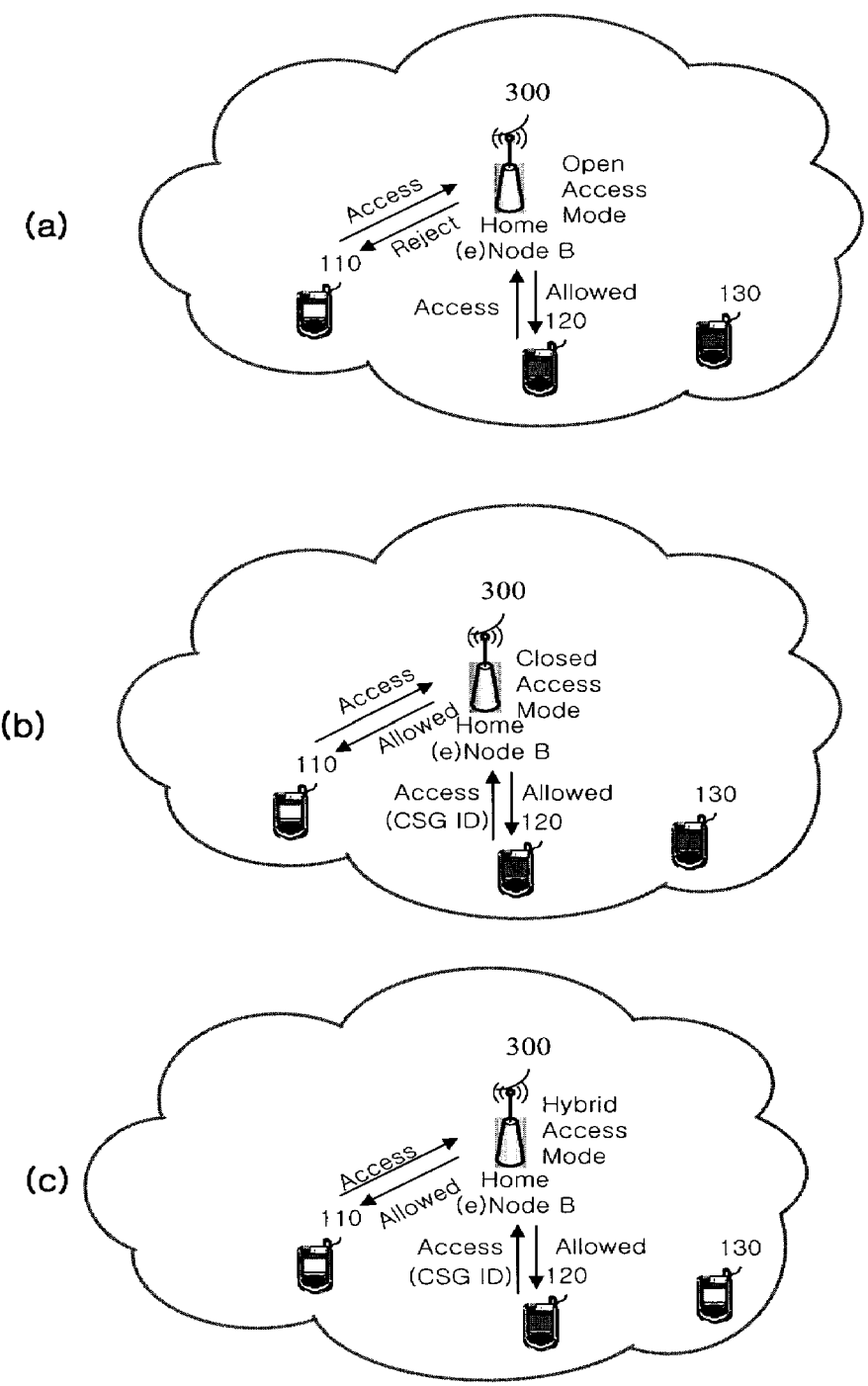
FIG. 5 is conceptual diagrams illustrating the access modes of a Home (e)NodeB 300.

FIG. 5 is conceptual diagrams illustrating the access modes of a Home (e)NodeB 300.

A femto base station illustrated in the drawing, for instance, Home (e)NodeB 300, can be operated in three modes, such as an open access mode of FIG. 5(*a*), a closed access mode of FIG. 5(*b*), and a hybrid access mode of FIG. 5(*c*). The closed access mode can be used only by the CSG members supported by its own group. The open access mode is a mode that is operated like a normal access without the concept of CSG, and in this case, a normal UE is also accessible. The hybrid access mode is a mode in which the Home (e)NodeB 300 is operated in a closed access mode or open access mode.

First, referring to FIG. 5(*a*), there is illustrated an example of the open access mode. As described in the forgoing definition of terms, the open access mode denotes a situation in which a cell of the Home (e)NodeB 300 is accessible by all UEs without restricting the access. Accordingly, the access by a plurality of UEs 110, 120, 130 is all allowed.

Next, referring to FIG. 5(*b*), there is illustrated an example of the closed access mode. In the closed access mode, a Home (e)NodeB 300 is operated as a cell of the closed subscriber group (CSG). In other words, the Home (e)NodeB 300 allows the access only for a user terminal allowed thereto. The Home (e)NodeBs 300 have CSG IDs capable of providing a service. For the purpose of this, the Home (e)NodeB 300 stores an ID list of the closed subscriber group (CSG). Each user receives a license for each CSG. For example, the Home (e)NodeB 300 illustrated in the drawing supports a first closed subscriber group (CSG), a second closed subscriber group (CSG), and a third closed subscriber group (CSG). Here, if the first UE 110 does not have memberships of the first through the third closed subscriber groups but the second UE 120 has the memberships, then the Home (e)NodeB 300 rejects an access of the first UE 110, and authorizes only an access of the second UE 120 as illustrated in the drawing.

On the other hand, the CSG membership may have an expired time. When receiving an access request from the second UE 120 after the expired timed has been expired, the Home (e)NodeB 300 may reject the access request.

However, when the CSG membership of the UE for the Home (e)NodeB 300 is expired while the Home (e)NodeB 300 provides a service to the second UE 120, the service being provided to the UE is suspended by the Home (e)NodeB 300 in the prior art. However, according to this specification, if the membership is expired, then the UE 100 may perform handover to another appropriate Home (e)NodeB or (e)NodeB.

The Home (e)NodeB 300 may provide information (or parameter) on such a cause of the handover, i.e., information on the expiry of the CSG membership, to the network entity, for instance, MME. Then, the network entity, for instance, MME, may store the information. Then, the network entity, for instance, MME, may reversely hand over the UE to the Home (e)NodeB 300 when the membership is updated afterwards, based on the information.

Last, referring to FIG. 5(*c*), there is illustrated an example of the hybrid access mode. In the hybrid access mode, the Home (e)NodeB 300 supports both a terminal of the closed subscriber group (CSG) and a terminal of the non-closed subscriber group (non-CSG).

In other words, the hybrid access mode is operated like a CSG cell for providing a service to the closed subscriber group (CSG), but the access of a terminal of the non-closed subscriber group (non-CSG) is allowed. For example, as illustrated in the drawing, the first UE 110 can access to the Home (e)NodeB 300 even though it does not have a CSG membership for the Home (e)NodeB 300 (i.e., non-closed subscriber group (non-CSG) member). However, service quality of the first UE 110 corresponding to the non-closed subscriber group (non-CSG) may be lower than that of the other UE having a CSG membership.

On the other hand, when the CSG membership of the second UE 120 for the Home (e)NodeB 300 is expired while the Home (e)NodeB 300 provides a service to the UE, the second UE 120 may be switched over to an non-closed subscriber group (non-CSG) member to continue to receive the service.

However, the quality is reduced as being switched to the non-closed subscriber group (non-CSG). At this time, in case where it is inappropriate to continue to perform the service due to the reduced quality, the UE 100 may perform a handover to another appropriate Home (e)NodeB or (e)NodeB according to this specification.

The Home (e)NodeB 30 may provide information (or parameter) on the cause of the handover, for example, information on the switchover to the non-closed subscriber group (non-CSG) member and dissatisfaction of the quality, to the network entity, for instance, MME. Then, the network entity, for instance, MME, may store the information. Then, the network entity, for instance, MME, may reversely hand over the UE to the Home (e)NodeB 300 when the membership is updated afterwards, based on the information.

Figure 6:
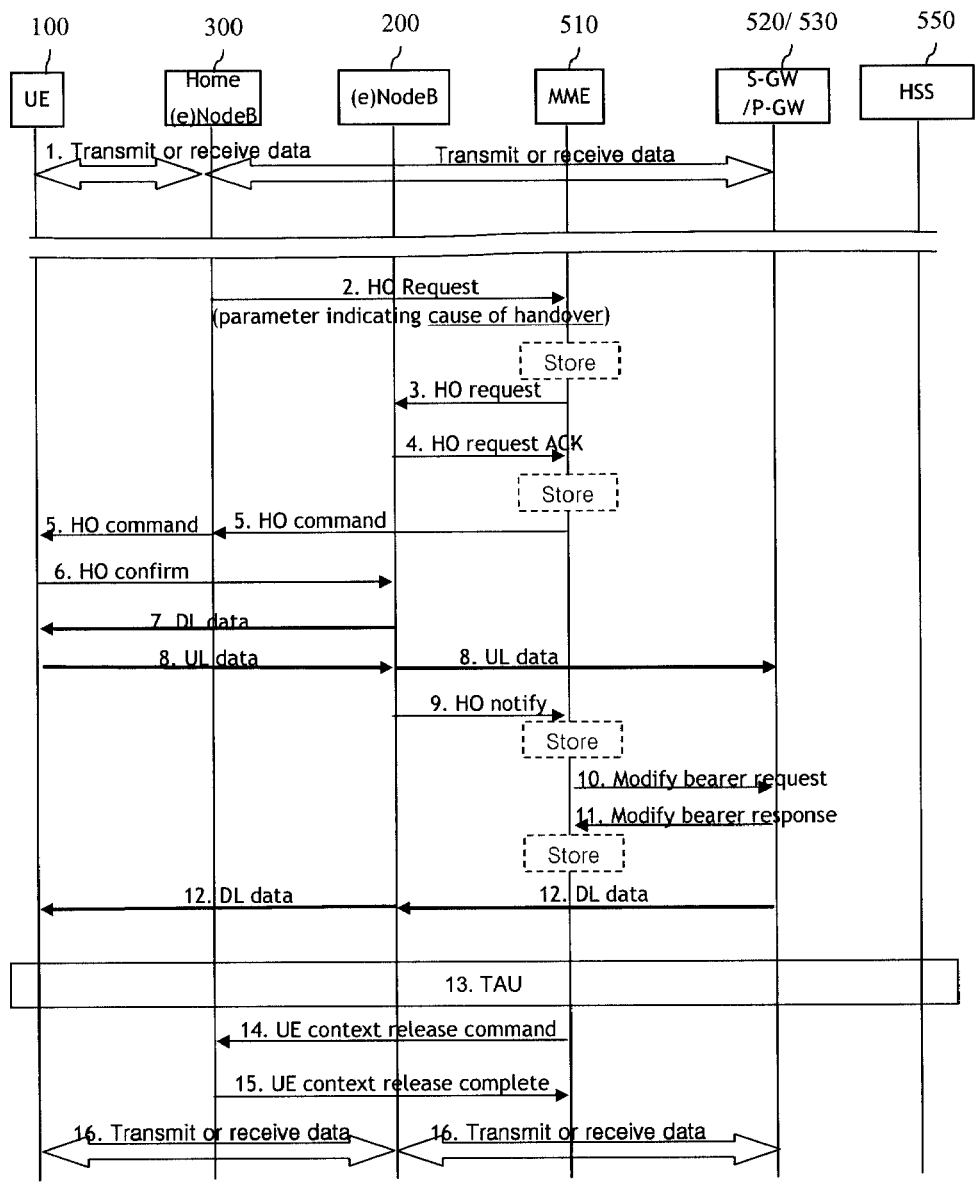
FIG. 6 is a flow chart illustrating an example in which UE 100 performs handover from a Home (e)NodeB 300 to an (e)NodeB.

FIG. 6 is a flow chart illustrating an example in which UE 100 performs a handover from a Home (e)NodeB 300 to an (e)NodeB.

Referring to FIG. 6, according to the present invention, in case where the UE 100 receiving a service from the Home (e)NodeB 300 performs a handover to another base station, for instance, (e)NodeB 200 or Home (e)NodeB, a MME 510 stores information on the cause of the handover. The timing of storing the information may be various as illustrated in the drawing. More specifically, it will be described below.

1) The UE 100 establishes a bearer with respect to a S-GW 520 and a P-GW 530 in the user plane through the Home (e)NodeB 300 to transmit or receive data in the user plane.

2) Subsequently, in case where it is inappropriate for the Home (e)NodeB 300 to continue to provide the service on the ground of a changed status, for instance, overload, temporary drop due to maintenance, expiry of CSG membership for the UE, increase of temporary interference, policy change, or the like, the Home (e)NodeB 300 transmits a message indicating that handover is required, or handover request message, for instance, HO request message. The message indicating that handover is required, or handover request message is a message transmitted from a source base station, i.e., the Home (e)NodeB 300 illustrated in the drawing, to a target base station, i.e., the (e)NodeB 200 illustrated in the drawing. The message indicating that handover is required, or handover request message is a message based on a S1 application protocol (S1-AP).

The message indicating that handover is required, or handover request message may include information on an identifier capable of identifying the UE 100, i.e., ID (for example, UE S1AP ID) or parameter indicating an identifier, and information on the handover cause (for instance, overload, etc. as described above) (or "Reduce load in serving cell") or parameter indicating the cause. Furthermore, the message indicating that handover is required, or handover request message may further include at least one of identification information (for instance target eNodeB Identity) of a target indicating a target TAI.

The message indicating that handover is required, or handover request message may include at least one of parameters as illustrated in the following table.

TABLE 1

| Parameter | Description |
|---|---|
| Message Type | Message Type |
| MME UE S1AP ID | A parameter indicating information for a MME to identify a particular UE. A parameter used for distinguishing a bearer established between the MME and the UE. |
| eNB UE S1AP ID | A parameter indicating information for an eNodeB to identify a particular UE. A parameter used for distinguishing a bearer established between the eNodeB and the UE. |
| Handover Type | Indicate the type of handover |
| Cause | A parameter indicating a cause that this message has been started. The cause of handover may include overload, Reduce load in serving cell, temporary drop due to maintenance, expiry of CSG membership for the UE, increase of temporary interference, policy change, or the like. |
| Target ID | ID of a target base station |

3) If the message indicating that handover is required, or handover request message is received, then the MME 510 transmits for instance, a HO request message, for instance, HO request to the target base station, for instance, (e)NodeB

200. At this time, the MME 510 can determine whether or not the handover is required based on the cause included in the message. The handover request message allows the target base station, i.e., (e)NodeB 200, to generate a context (i.e., UE context) including bearer-related information. The handover request message may include information on the cause of handover or a parameter indicating the cause.

During the process, the MME 510 may store at least one of the parameters within a message indicating that the handover is required, or handover request message. For example, the MME 510 stores information on the cause of handover or a parameter indicating the cause (i.e., the Cause parameter), and identification information of a target base station or a parameter indicating an identifier (i.e., Target ID parameter). The storing may be performed within a context with respect to the UE 100, for instance, MME bearer context.

On the other hand, the MME 510 may acquire information on the cause of handover or a parameter indicating the cause (i.e., the Cause parameter), and identification information of a target base station or a parameter indicating an identifier from another entity within a network. The acquiring may not be performed during the foregoing process but may be performed during any process, for example, the process, or the like. Also, the storing may not be performed during the foregoing process but may be performed, for example, during the 4th or 9th process among various processes as will be described later.

4) The target base station, i.e., (e)NodeB 200, transmits a handover request acknowledgement (response) message, for instance, HO request ACK message, in response to the handover request message. The handover request acknowledgement (response) message may include TEID information.

When the parameters are not stored during the foregoing 3rd process, at least one of the parameters stored within the message indicating that the handover is required, or handover request message may be extracted and stored during the foregoing process.

5) If the handover request acknowledgement (response) message is received, then the MME 510 transmits a handover command message, for instance, HO command message to the Home (e)NodeB 300 in order to perform a handover of the UE during the radio section. Then, the Home (e)NodeB 300 delivers the handover command message to the UE 100. The handover command message may include a parameter indicating identification information or identifier of the target base station, i.e., (e)NodeB 200.

6) If the handover command message is received, the UE 100 transmits a handover confirmation (approval) message, for instance, HO Confirm message to the target base station, i.e., (e)NodeB 200.

7) In case where there exists downlink data to be transmitted when the handover during the radio section has been completed as described above, the target base station, i.e., (e)NodeB 200 transmits the downlink data to the UE 100.

8) Similarly, in case where there exists uplink data, the UE 100 also transmits the uplink data to the (e)NodeB 200, and then the (e)NodeB 200 delivers the uplink data to the S-GW 520.

9) On the other hand, the (e)NodeB 200 transmits a message notifying that the carried-out handover has been recognized, or a message indicating that handover has been completed, for instance, HO notify message, to the MME 510.

In case where the parameters are not stored during the foregoing 3rd or 4th process, then the MME 510 may extract and store a message indicating that the handover is required, or at least one of the parameters that have been within the handover request message during the process. The advantage of when storing during the foregoing process is as follows. If the parameters are stored during the foregoing 3rd or 4th process but the handover is failed during the fifth process, the stored parameters should be abandoned, and thus it may be unnecessary storing. Accordingly, it may be more effective to store the parameters during the 9th process.

10) If a message indicating that the handover has been completed is received, the MME 510 transmits a bearer update (modify) message, for instance, Modify bearer request message, to the S-GW 520 in order to update a context (for instance, bearer context). The S-GW 520 delivers it to the P-GW 530. The bearer update (modify) message may include a target base station, i.e., an address of the (e)NodeB 200, and TEID in order to transmit downlink data to the UE 100.

11) Then, the P-GW 530 transmits the bearer update (modify) message to the S-GW 520, and the S-GW 520 transmits the bearer update (modify) message to the MME 510.

In case where the parameters are not stored during the foregoing 3rd, 4th, or 9th process, the MME 510 may extract and store a message indicating that the handover is required, or at least one of the parameters that have been within the handover request message during the process.

12) Then, the downlink data to the UE 100 may be delivered to the UE 100 through the (e)NodeB 200.

13) On the other hand, a tracking area update (TAU) process for HSS location registration of the UE 100 is performed.

14) The MME 510 transmits a context for the UE that remained in the source base station, i.e., Home (e)NodeB 300, namely, a context release message, for instance, UE Context release command message, to the Home (e)NodeB 300 in order to release the UE context.

15) The Home (e)NodeB 300 transmits a response message, for instance, UE Context release complete message, to the MME 510.

16) On the other hand, the UE 100 transmits and/or receives data in the user plane to and/or from the S-GW/P-GW 520/530 through the (e)NodeB 200.

As described above, the MME 510 can obtain information or parameter for a reason that the UE 100 performs a handover to another base station, and store the information or parameter. The storing may be performed during any process illustrated in FIG. 6.

Figure 7:
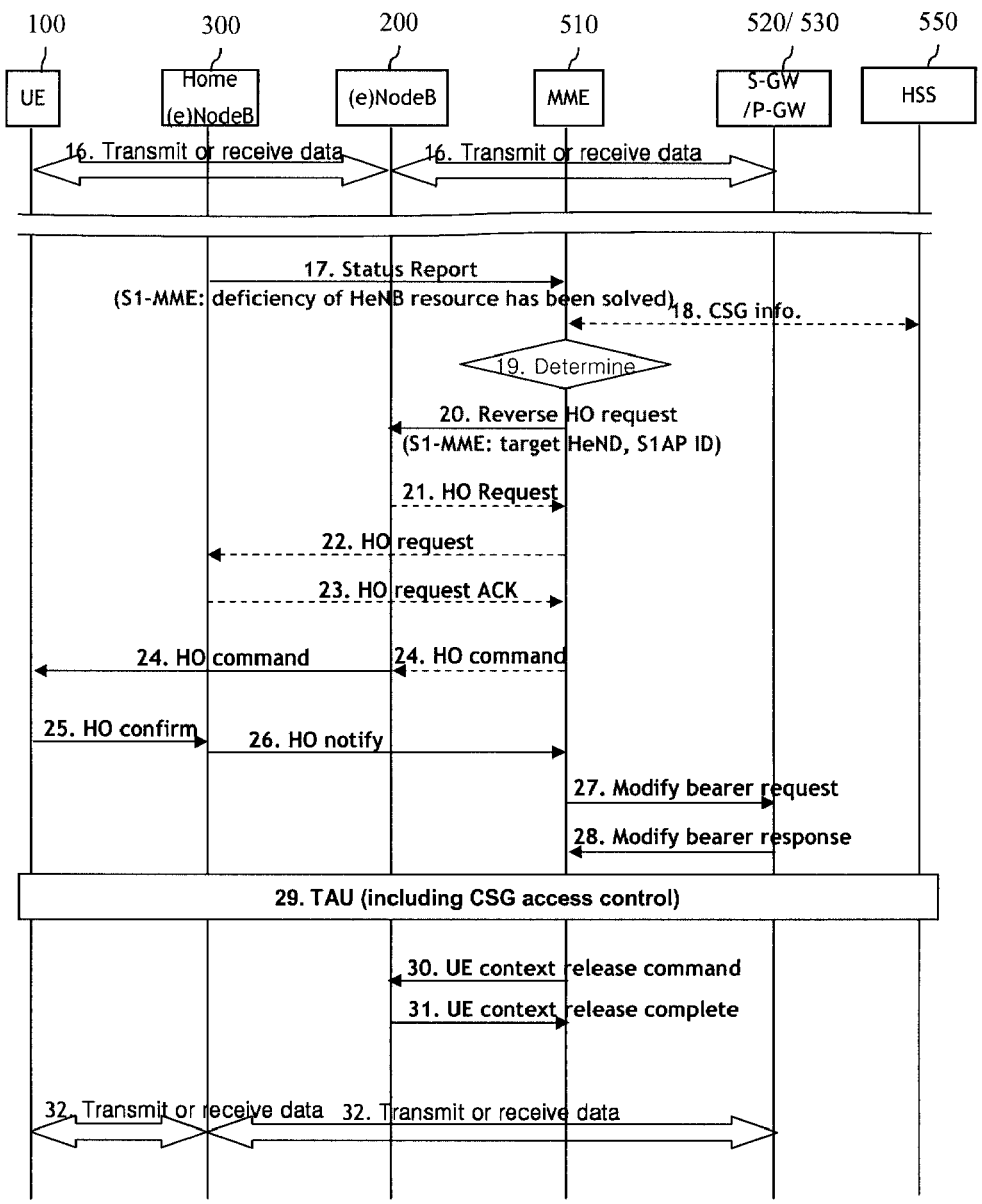
FIG. 7 is a flow chart illustrating an example in which the handed-over UE as illustrated in FIG. 6 performs a handover again to Home (e)NodeB 300.

FIG. 7 is a flow chart illustrating an example in which the handed-over UE as illustrated in FIG. 6 performs a reverse handover again to Home (e)NodeB 300.

Referring to FIG. 7, when the status of the original base station of the UE 100, i.e., Home (e)NodeB 300, is changed, in other words, when the cause of the handover is solved (removal of overload, completion of maintenance, update of CSG membership for the UE, decrease of temporary interference, policy change), the MME 510 is allowed to perform a reverse handover for the UE 100 to the Home (e)NodeB 300 on the basis of the information on the changed status and the information on the cause of the handover. More specifically, it will be described below.

The process numbers as illustrated in FIG. 7 are given subsequent to the 16th process of FIG. 6.

16) As illustrated in FIG. 6, the UE 100 transmits and/or receives data in the user plane from and/or to the S-GW/P-GW 520/530 through the (e)NodeB 200 after performing a handover from the Home (e)NodeB 300 to the (e)NodeB 200.

17) When the status of the Home (e)NodeB 300 corresponding to the original base station of the UE 100 is changed prior to the handover, in other words, when the cause of the handover is solved (removal of overload, completion of maintenance, update of CSG membership for the UE, decrease of temporary interference, policy change), the Home (e)NodeB 300 transmits a status report message, for instance, Status Report message, to the MME 510. The status report message may include a parameter indicating the cause of handover has been solved. Also, the status report message may include information on the changed status or information of the solved cause. The information on the solved cause may indicate that resource shortage phenomenon has been solved, for instance, as illustrated in the drawing. Also, the information on the solved cause may be an update of the CSG membership.

18) The MME 510 searches whether or not there exists a terminal that has performed a handover from the Home (e)NodeB 300 to another base station. At this time, the search is performed with respect to a context, for instance, UE Context. Through the search, the MME 510 confirms that the terminal that has performed a handover from the Home (e)NodeB 300 to another base station is the UE 100.

Then, the MME 510 may obtain at least one of subscriber information of the UE 100, information on the policy of the Home (e)NodeB, policy information (for instance, policy of the (e)NodeB, policy of the Home (e)NodeB), and information on the CSG membership of the UE for the Home (e)NodeB 300 from a HSS 550. The subscriber information of the UE 100 may have been delivered to the MME through an interaction with the HSS during the previous attach/TAU process, and therefore, the MME 510 may already have the information.

19) The MME 510 determines whether to perform a reverse handover for the UE 100 to the Home (e)NodeB 300 corresponding to the original base station on the basis of the status report message and the obtained information. At this time, the MME 510 may consider at least one of the obtained subscriber information, policy of the service provider, policy of the Home (e)NodeB, and information on the CSG membership in the determining step. If the UE 100 is a temporary member, then the CSG information obtained from the HSS is CSG ID and time period, and therefore, the MME 510 may use the time period as a basis of determination. Also, the CSG information is based on subscriber information, and therefore, it may be possible to use the information as a basis of selection according to the type of CSG member or priority of the type, or according to the priority of a group to which the member belongs.

As an example for the determination, in case where it is grasped that the solved cause is an update of the CSG membership based on the status report message, the MME 510 may determine that the UE performs a handover to the Home (e)NodeB 300 based on the updated membership. Furthermore, in case where it is grasped that the solved caused is a removal of resource shortage phenomenon or when the resource of the Home (e)NodeB is larger than the resource of (e)NodeB corresponding to a current serving cell based on the status report message, the MME 510 may determine that the UE 100 performs a handover to the Home (e)NodeB 300. In addition, in case where it is grasped that the solved caused is a removal of resource shortage phenomenon or in case where the resource of the Home (e)NodeB is sufficiently large at any normal time based on the status report message, the MME 510 may determine that the UE 100 performs a reverse handover to the Home (e)NodeB 300.

On the other hand, when information on the solved cause is not included within the status report message during the 17th process, the MME 510 may grasp information on the solved cause from another entity within a network based on the status report message. For example, if the status report message is received, then the MME 510 checks information on the stored handover cause. Then, the MME 510 may inquire of an appropriate network entity about a current status of the Home (e)NodeB 300 based on the information on the handover cause. As a specific example, in case where it is confirmed that the handover cause was an expiry of the CSG membership, the MME 510 may check with the HSS 550 whether or not the membership of the UE 100 for the Home (e)NodeB 300 has been updated.

20) In case where it is determined to perform a reverse handover as described above, the MME 510 transmits a message indicating reverse handover, or reverse handover request message, for instance, Reverse HO request message to the (e)NodeB 200. The reverse handover request message may include identification information of a target base station (i.e., Home (e)NodeB 300) and a parameter indicating the identification information of the UE (for instance, S1 AP ID parameter). The reverse handover request message, for instance, Reverse HO request message, is a newly defined message according to the present invention. The message indicating a reverse handover may be typically provided by adding a field indicating a reverse handover in a message used for indicating a handover, for instance, HO command message.

21-23) Then, the (e)NodeB 200 transmits a message indicating that handover is required, or handover request message, for instance, HO request message to the MME 510 as illustrated in the 2nd process of FIG. 6. Here, the 22nd and 23rd processes illustrated in the drawing are similar to the 3rd and 4th processes of FIG. 6, respectively. On the other hand, the 21st through 23rd processes may be omitted according to the implementation of the reverse handover request message during the 20th process.

24-28) The 24th through 28th processes illustrated in the drawing are similar to the 5th, 6th, 9th, 10th, and 11th processes of FIG. 6, and thus they will not be described in detail herein.

29) A tracking area update (TAU) process for HSS location registration of the UE 100 is performed. At this time, when the Home (e)NodeB 300 is operated in a closed access mode, an access control process for checking whether or not the UE 100 has a CSG membership for the Home (e)NodeB 300 may be performed. The access control process denotes a process in which the MME 510 determines whether to receive a request of the relevant UE based on the subscriber information when receiving a TAU request from the UE 100 through the Home (e)NodeB 300. In other words, it means a process in which the MME 510 checks information such as the CSG ID to determine whether to allow an access to the relevant UE.

30-32) The 30th through 32nd processes are similar to the description of FIG. 6, and thus will be omitted herein.

Figure 8:
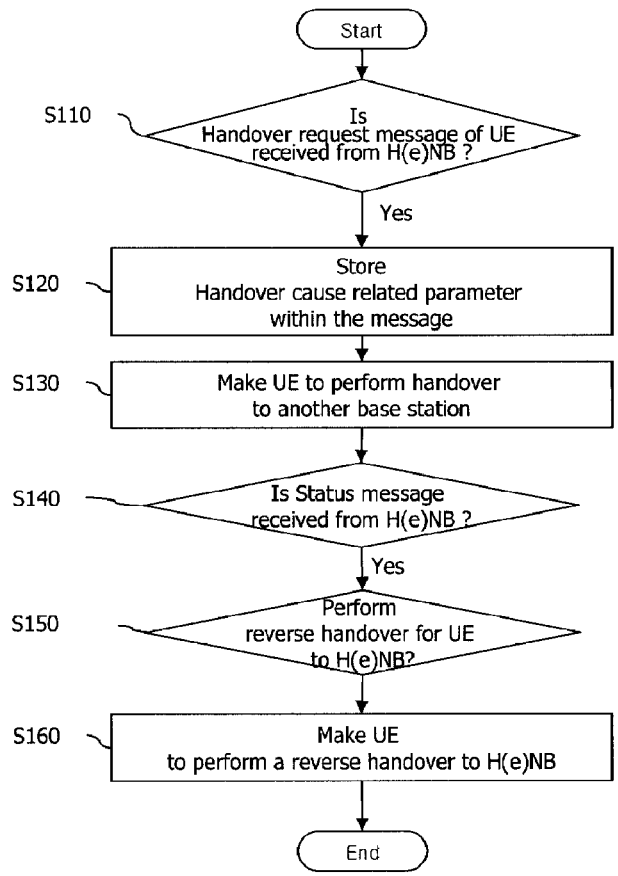
FIG. 8 is a flow chart illustrating the operation of a MME 510 illustrated in FIGS. 6 and 7.

FIG. 8 is a flow chart illustrating the operation of a MME 510 illustrated in FIGS. 6 and 7.

Referring to FIG. 8, the MME 510 receives a handover request message including information or a parameter on a cause that a terminal should perform a handover from a Home (e)NodeB corresponding to a serving base station of the terminal to another base station (S110).

Then, the information or parameter on the cause within the handover request message is stored (S120).

Then, the MME 510 hands over the UE 100 to another base station (S130). In other words, the MME 510 transmits a handover command message to the Home (e)NodeB so that the terminal performs a handover to another base station.

Subsequently, if a status report message is received from the Home (e)NodeB, then the MME 510 determines whether the UE 100 is to perform a reverse handover to the Home (e)NodeB 300 (S150). In other words, when receiving the status report message, the MME 510 determines whether the terminal is to perform a revere handover from the another base station to the Home (e)NodeB based on whether or not the cause has been solved.

If it is determined to perform the reverse handover, then the MME 510 performs a reverse handover for the UE 100 (S160). In other words, the MME 510 transmits a control message to perform the reverse handover according to the determination.

The storing process (S120) may be performed between the process of S110 and the process of S130, or may be performed between the other processes.

On the other hand, the MME 510 may further perform part or all of the processes illustrated in FIGS. 6 and 7 in addition to the processes illustrated in FIG. 8. Otherwise, the MME 510 may not perform part of the processes illustrated in FIGS. 6 and 7 to omit them.

Figure 9:
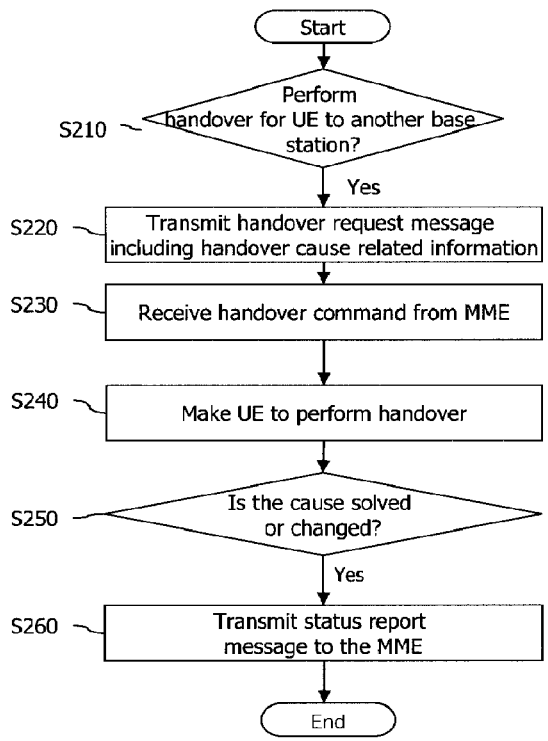
FIG. 9 is a flow chart illustrating a Home (e)NodeB 300 illustrated in FIGS. 6 and 7.

FIG. 9 is a flow chart illustrating a Home (e)NodeB 300 illustrated in FIGS. 6 and 7.

Referring to FIG. 9, in case where the UE perform a handover to another base station (S210), the Home (e)NodeB 300 transmits a handover request message including information on a cause of that the UE performs a handover to the another base station to the MME 510 (S220).

If a handover command from the MME (S230) is received, the Home (e)NodeB 300 hands over the UE to another base station (S240). In other words, the Home (e)NodeB delivers the handover command message to the UE to hand over the UE.

On the other hand, if a situation corresponding to the cause of the handover is changed (S250), then the Home (e)NodeB 300 transmits a status report message to an entity within the network (S260).

On the other hand, the Home (e)NodeB 300 may further perform part or all of the processes illustrated in FIGS. 6 and 7 in addition to the processes illustrated in FIG. 8. Otherwise, Home (e)NodeB 300 may not perform part of the processes illustrated in FIGS. 6 and 7 to omit them.

As described up to this point, a method according to the present invention can be realized by software, hardware, or their combination. For example, a method according to the present invention may be stored in a storage medium (e.g., internal terminal, flash memory, hard disk, etc.), and may be realized by codes or commands within a software program that is executable by a processor, such as microprocessor, controller, microcontroller, application specific integrated circuit (ASIC). It will be described with reference to FIG. 10.

Figure 10:
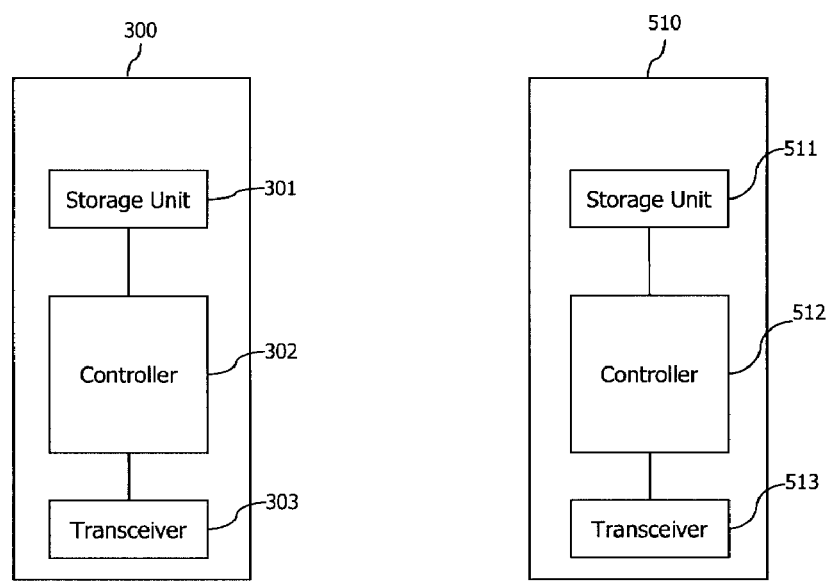
FIG. 10 is a configuration block diagram of a Home (e)NodeB 300 and a MME 510.

FIG. 10 is a configuration block diagram of a Home (e)NodeB 300 and a MME 510.

As illustrated in FIG. 10, the Home (e)NodeB 300 may include a storage means 301, a controller 302, and a transceiver 303.

The MME 510 may include a storage means 511, a controller 512, and a transceiver 513.

The storage means store a software program in which a method illustrated in FIGS. 5 through 9 is realized.

Each of the controllers controls the storage means and the transceivers respectively. Specifically, the controllers implement each of the foregoing methods stored in the storage means respectively. Then, each of the controllers transmits the foregoing signals through the transceivers.

Specifically, the transceiver 303 of the Home (e)NodeB 300 transmits a handover request message including information on a cause that the UE performs a handover to another base station to the MME 510, and receives a handover command message from the MME 510. Then, the transceiver 303 delivers the handover command message to the UE 100.

If it is confirmed that a situation corresponding to the cause is changed, then the controller 302 controls the transceiver 303 to transmit a status report message to the MME 510.

On the other hand, if a handover request message including information on a cause that the UE 100 perform a handover to another base station from the Home (e)NodeB is received, then the transceiver 513 of the MME 510 transmits a handover command message to the Home (e)NodeB 300 to hand over the UE 100 to another base station.

If a status report message is received from the Home (e)NodeB 300 through the transceiver 513, the controller 512 of the MME 510 determines whether to reversely hand over to the Home (e)NodeB based on whether or not the cause has been solved.

Though preferred embodiments of present invention are exemplarily described as disclosed above, the scope of the invention is not limited to those specific embodiments, and thus various modifications, variations, and improvements can be made to the present invention without departing from the spirit of the invention, and within the scope of the appended claims.

The invention claimed is:

1. A method of controlling handover in a server in charge of a control plane within a mobile communication network, the method comprising:
   receiving a handover required message including information that the terminal performs handover from a Home (e)NodeB operating as a cell of Closed Subscriber Group (CSG) to another base station, wherein the information indicates that a CSG membership for the terminal in a Home (e)NodeB has expired;
   transmitting a handover command message to the Home (e)NodeB for the terminal to perform a handover to another base station;
   receiving a status report message from the Home (e)NodeB, wherein the status report message indicates that the CSG membership for the terminal is re-established;
   receiving information related to a CSG membership of the terminal from a Home Subscriber Server (HSS) after the terminal handover was performed from the Home (e)NodeB to another base station;
   determining that the terminal performs a reverse handover from the another base station to the Home (e)NodeB based on the status report message and information obtained from the HSS; and
   transmitting a control message to perform the reverse handover to another base station.

2. The method of claim 1, wherein the handover required message further comprises at least one of identification information of the terminal and information on the another base station.

3. The method of claim 1, wherein the information in the handover required message further comprises at least one of overload, maintenance, and policy change.

4. The method of claim 1, wherein the status report message comprises information on whether the CSG membership for the terminal is allowed access to the Home (e)NodeB.

5. The method of claim 1, wherein the status report message comprises at least one of a parameter indicating that a cause of the handover has been solved, information on the changed status of the Home (e)NodeB, and information on the solved cause.

6. The method of claim 1, wherein at least one of subscriber information of the terminal, policy information, membership information of the terminal for the Home (e)NodeB is considered in the determining step.

7. The method of claim 1, wherein the control message is transmitted to the another base station, and corresponds to a message indicating reverse handover, a reverse handover request message or a handover request message.

8. The method of claim 1, wherein the control message is transmitted to the Home (e)NodeB, and corresponds to a handover request message.

9. The method of claim 1, further comprising:
   storing the information within the handover required message.

10. A server in charge of a control plane within a mobile communication network, the server comprising:
   a transmitter transmitting a handover command message to a Home (e)NodeB for a terminal to perform a handover to another base station when the server receives a handover required message including information that the terminal performs a handover from the Home (e)NodeB operating as a cell of Closed Subscriber Group (CSG) to the another base station, wherein the information indicates that a CSG membership for the terminal in the Home (e)NodeB has expired and transmitting to the another base station a control message to perform a reverse handover;
   a receiver receiving a status report message from the Home (e)NodeB, wherein the status report message indicates that the CSG membership for the terminal is re-established, and receiving information related to a CSG membership of the terminal for the Home (e)NodeB from a Home Subscriber Server (HSS); and
   a controller determining that the terminal performs the reverse handover from the another base station to the Home (e)NodeB based on the status report message and information comprising an access authority to a Home (e)NodeB obtained from the HSS.

* * * * *